May 12, 1936.                F. J. WESTROPE                    2,040,680
                              VEHICLE BODY
                      Filed March 17, 1933           2 Sheets-Sheet 1
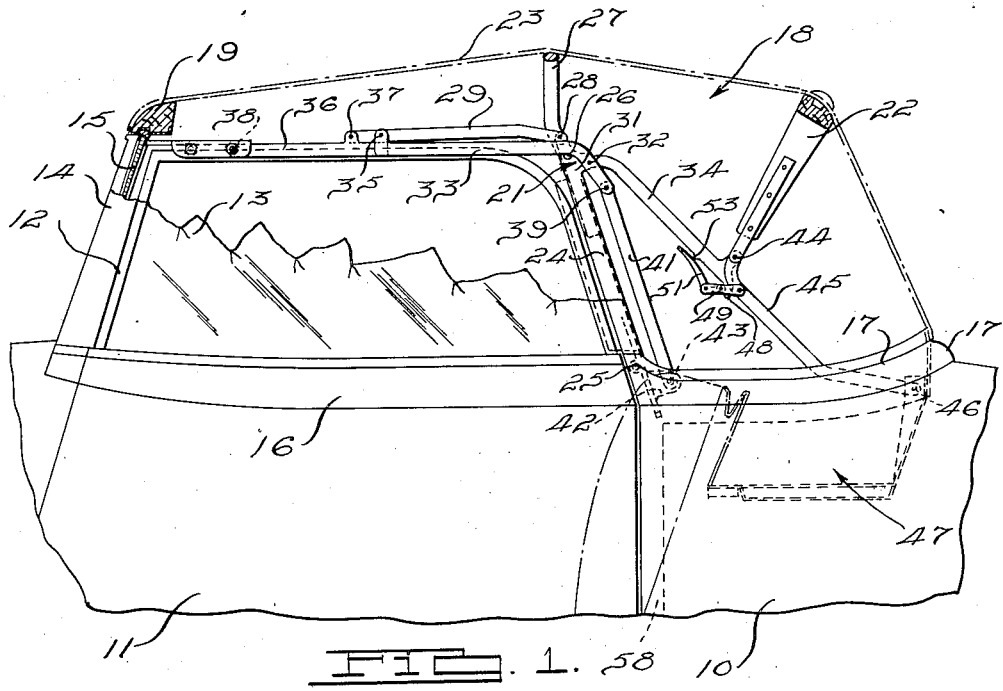
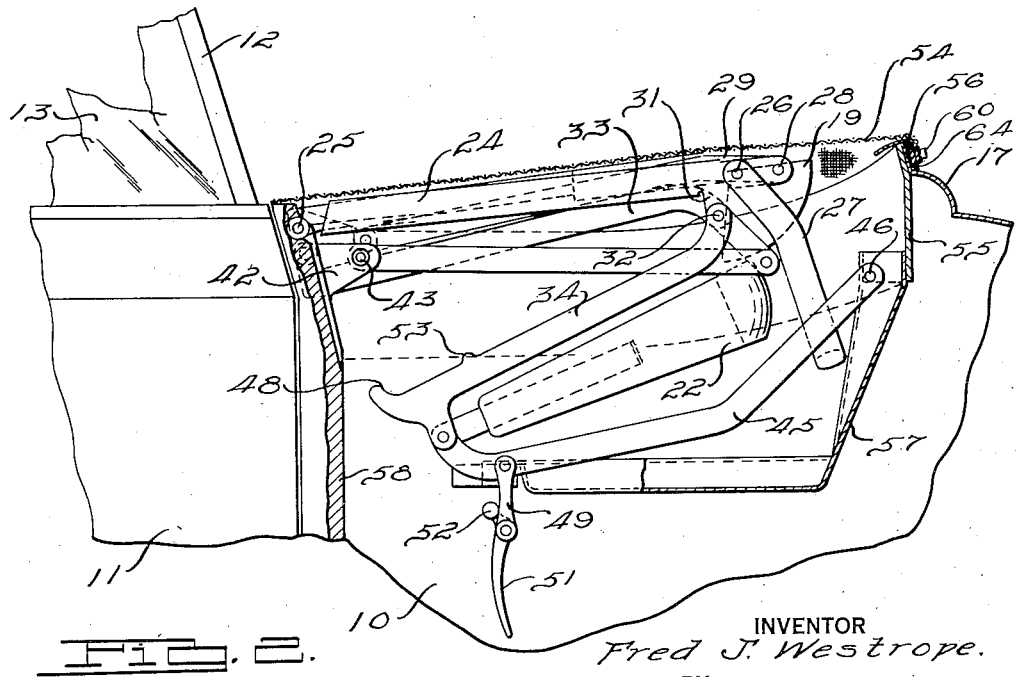
INVENTOR
Fred J. Westrope.
BY
Harness, Dickey, Pierce & Hann.
ATTORNEYS.

May 12, 1936.  F. J. WESTROPE  2,040,680
VEHICLE BODY
Filed March 17, 1933  2 Sheets-Sheet 2
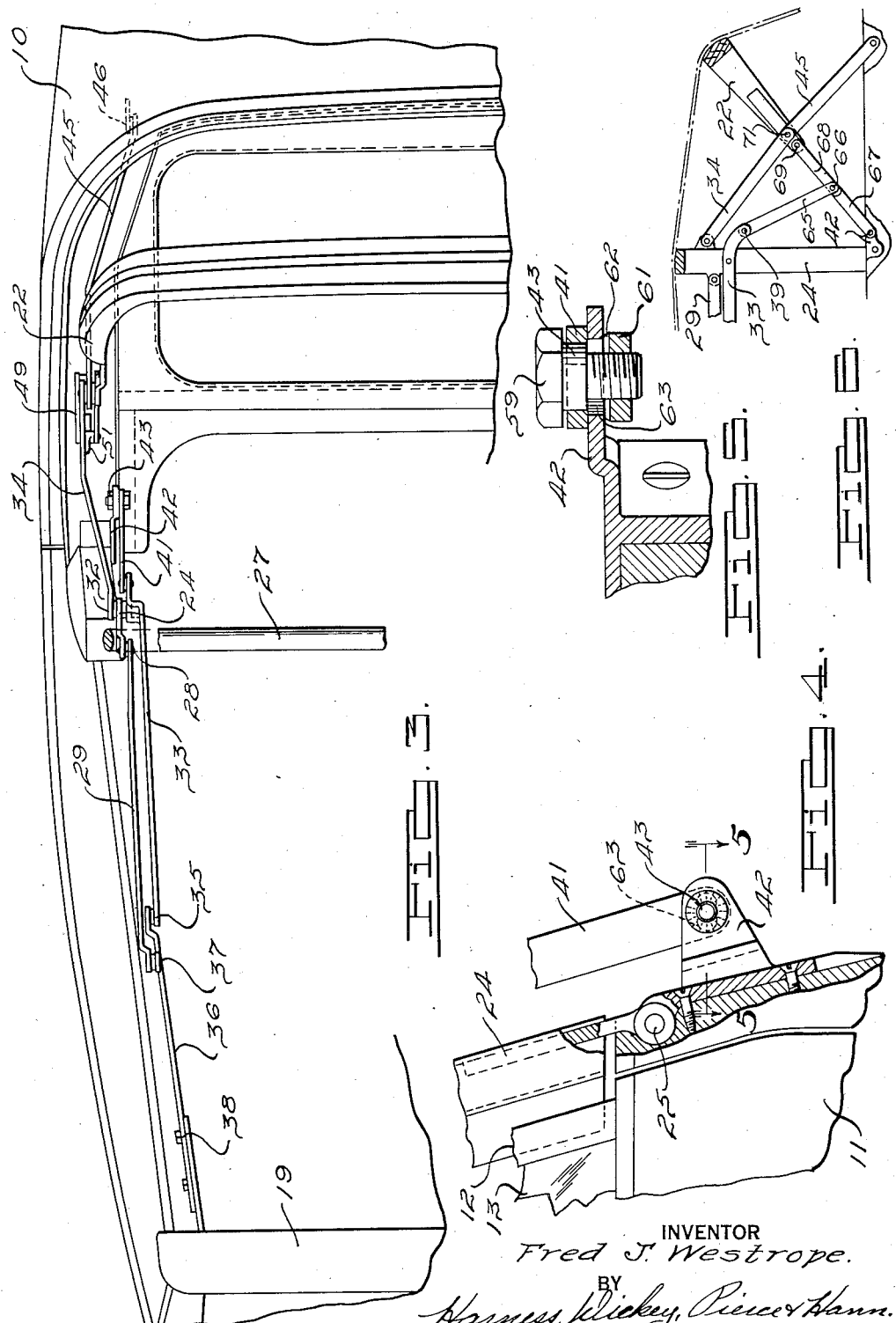
INVENTOR
Fred J. Westrope.
BY
ATTORNEYS.

Patented May 12, 1936

2,040,680

UNITED STATES PATENT OFFICE 2,040,680

VEHICLE BODY

Fred J. Westrope, Detroit, Mich., assignor to The Murray Corporation of America, Detroit, Mich., a corporation of Delaware Application March 17, 1933, Serial No. 661,241

2 Claims. (Cl. 296—107)

My invention relates to vehicle tops and particularly to a vehicle top of the collapsible type having supporting elements which are foldable to form a compact unit which is entirely received within the confines of a small compartment in the vehicle body.

While it has been the practice heretofore to construct foldable tops for vehicle bodies, the top, when in collapsed position, was always visible and was more or less unsightly in appearance. Many tops have been invented to simplify the supporting structure and its operation and to enhance the appearance of the structure when in collapsed position and marked improvements have been made.

In practicing my present invention I provide a compartment in the body portion of the vehicle and construct the supporting elements for the top in such manner that when the top is in folded position all of the supporting structures and the covering material is received within the compartment to be completely hidden from view. The compartment is disposed back of the seat of the vehicle and is available, when the top is in raised position, for use as a package compartment. A cover element may be provided for covering the compartment when the top is collapsed therein to constitute a deck behind the seat beneath which the presence of a top in the vehicle would not be suspected. The compartment is of narrow width in view of the foldable linkage system employed for collapsing and supporting the bows of the top, the forward one of which is foldable, and at the same time provides rigid support and a desirable contour for the top covering element.

Accordingly, the main objects of my invention are; to provide a foldable top for a vehicle which is completely encompassed by the body when in closed position; to provide a support and a lever system for the top covering element which is foldable to reduce the overall dimensions when in collapsed position; to provide a compartment in the rear of the seat which may be employed as a receptacle for parcels when the top is in raised position and which may be employed to completely receive the top structure when the top is in lowered position; to provide a cover for the receptacle for completely hiding the top from view when enclosed thereby; to have one of the supporting bows foldable and the other moved forwardly of the body when collapsed so as to reduce its rearward extension which thereby reduces the length of the compartment; and in general, to provide a collapsible top which is simple in construction and operation and which is completely hidden within a small compartment when in collapsed position.

Other objects and features of novelty of my invention will be either specifically pointed out or will become apparent when referring, for a better understanding of my invention, to the following description taken in conjunction with the accompanying drawings, wherein:

Figure 1 is a broken view, in side elevation, of a vehicle body provided with a top construction which embodies features of my invention, Fig. 2 is an enlarged broken sectional view of the structure illustrated in Fig. 1, Fig. 3 is an enlarged broken plan view, partly in section, of the top construction illustrated in Fig. 1, Fig. 4 is an enlarged broken sectional view of a portion of the structure illustrated in Fig. 2, Fig. 5 is an enlarged sectional view of the structure illustrated in Fig. 4, taken on the line 5—5 thereof; and Fig. 6 is a broken view of a modified form of construction similar to that illustrated in Fig. 1.

Considerable ingenuity has been exercised in the construction of collapsible tops for vehicles to simplify and cheapen the construction, to reduce the effort necessary to manipulate the top to raised or collapsed position, and to improve the appearance of the top when in both raised and lowered positions. While such improvements were embodied with patentable novelty and were an advancement over the types of structures theretofore employed and known, applicant has materially advanced the art over the known structures by having the top disappear from view when in collapsed position. By reducing the overall dimensions of the collapsed top, a very small compartment following the contour of the back of the seat will receive and entirely hide the top from view. A cover element may then be employed for closing the compartment and forming a small deck adjacent to the seat. The compartments form a storage place for packages when the top is in raised position.

The novelty of the structure for effecting the advantages pointed out hereinabove resides in the main bow having an upper bow portion pivoted to side members to have the bow portion foldable relative thereto and in so mounting an intermediate bow as to have the bow move forwardly of the body when the main bow is moved toward the rear thereof. The bow elements fold into a small compact unit, less in extent than the length of the bows and may be disposed in a compartment of very narrow width, directly back of the seat of the vehicle.

Referring to Fig. 1, I have illustrated a portion of a vehicle body 10 which is of the convertible coupe type. It is to be understood that the same type of construction may be employed on roadsters, cabriolets or on any vehicle utilizing a collapsible top. The body is provided with a door 11 having a slidable window frame 12 therein which is disposed about a window glass 13. Front pillars 14 embrace the side edges of the windshield 15 and provide a marginal edge for the door 11 and the glass frame 12. A belt line 16 follows the top edge of the door and is continued at 17 around the side and the back of the body, and will be described more fully hereinafter.

A foldable top 18 includes a front header 19, a main bow 21 and an auxiliary bow 22, all of which are united by links, levers and locking elements to assume, when raised, a position illustrated in Fig. 1, for supporting the top material 23 shown in dot-and-dash line. The links, levers and locking elements are so coordinated as to move the bow elements into intimate relation forming a small compact unit of reduced dimensions, as illustrated in Fig. 1.

The main bow 21 includes pillar portions 24 which are pivoted at 25 and which, in raised position as illustrated in Fig. 1, are adjacent to the rear edges of the frames 12 of the door windows. Pillar portions 24 have a top bow element 27 pivoted thereto at 26 and a second pivot 28 is provided to which link 29 is secured. A rearwardly extending arm 31 is provided on the pillar portion 24 for supporting a pivot 32 to which a lever 33 and one end of a link 34 are pivoted. The lever 33 is pivoted at 35 to a forwardly extending, adjustable link 36 which in turn has a pivot 37 to which link 29 is pivoted. The link 36 is adjustable at point 38 for locating the front header 19 relative to the bow 21 so as to permit the header to be secured to the front pillars 14.

The end of the lever 33 on the opposite side of the pivot 32 is pivoted at 39 to a link 41 which in turn is pivoted on the arm 42 at the point 43. The link 34 is pivoted to the bow 22 at the point 44 and has also pivoted thereto a link 45 which is pivoted at 46 to the wall of the compartment 47 which encompasses the folded top elements as illustrated in Fig. 2. The link 34 is provided with a detent 48, while link 45 has a link 49 pivoted thereto for supporting a pivoted locking handle 51.

When the top is to be raised, the front header 19 is grasped by an occupant of the seat and raised forwardly over the head to a position over the pillars where it is locked by suitable clamping means, not shown. Thereafter the handles 51 are grasped and manipulated to have the lugs 52 thereof extended into the detents 48 to cause the bow 22, positioned by the top material 23, to assume a predetermined position relative to the links 34 and 45 which move into aligned locked relation. The handle portion 51 is snapped against stop elements 53 and an over-center toggle relation is assumed between the pivot points of the link 49 and the lug 52, as illustrated more clearly in Fig. 1. In this position the top is retained in raised position and the cover material 23 is stretched to provide a smooth appearance.

When the top is to be lowered, the header 19 is loosened from the pillars 14 and the handles 51 are moved counter-clockwise to unlatched position, to release the links 34 and 45. The header 19 is then raised so that the link 36 hinges about the pivot point 35 upon the link 33 to cause the link 29 to apply a force rearwardly on the ends of the pillar portions 24 of the bow 21. The link 41 causes the link 33 to move in a counter-clockwise direction about the pivot 32 during the movement of the bow 21. In this manner, the header 19 is moved to a position in the vicinity of the pivots 26 and 28 of the bow 21, as illustrated in Fig. 2.

The release of the header 19 permits the bow 21 to move in a clockwise direction about the pivots 26 to a position substantially 90 degrees from the main pillar portion 24 as illustrated in Fig. 2. The bow 22 is drawn forward toward the front end of the vehicle, by the two links 34 and 45 as illustrated clearly in Fig. 2. All of the elements of the top are drawn forwardly from a position to which they would ordinarily extend if the bows were pivoted to the body, which is readily apparent from a careful examination of Figs. 1 and 2.

It will be noted in Fig. 2 that in collapsed position the pivot 46 extends outwardly of all of the bow and header elements, while in Fig. 1 if the bow members 21 and 22 were pivoted about the pivot 25, they would move to a position considerably beyond the point 46. However, by folding the bow 21 and having the bow 22 move forwardly, the extension of the bow is materially lessened and is such as to fall within the extension of the pivot 46, the outermost point of the top structure when in collapsed position.

For this reason the compartment 47 is disposed directly back of the seat and is constructed to form a receptacle for packages when the top is in raised position and as a compartment to completely encompass the top when in lowered position. The width of the compartment 47, back of the seat, is so small that the dimensions of the top need not be distorted to encompass the compartment, and accordingly the top will assume a position it normally would have assumed even though it were not capable of being encompassed by a compartment in the body. When the top is disposed in the compartment, a cover element 54 may be employed to completely cover the compartment and hide the top from view, being secured thereto by suitable releasing means, such as glove buttons 60 or the like, so that it may be readily removed to have the top available to cover the vehicle.

A further novelty in the construction resides in the reduced bracing member utilized for the body portion about the compartment. A single band 55 of relatively heavy gauge material, when compared to the gauge of the paneling, is secured to the rear pillars of the door and outlines the upper edge of the compartment, forming a support for the paneling which is flanged thereover and welded or otherwise secured thereto as illustrated at 56 in Fig. 2. A tacking strip 64 is secured about the edge, to which the edge of the cover material 23 is secured. This construction eliminates any bulk within the compartment and further reduces the rearward extension of the belt molding 17 which is the outline of the body at the junction of the top therewith. The element 55 may have a suitable pan 57 welded or otherwise secured thereto to form the compartment, as pointed out hereinabove.

In Fig. 2 an enlarged view of the pivots 25 and 43 is shown for the purpose of illustrating the adjusting feature provided for the link 41. The pivot 43 is the shouldered portion of a bolt 59 which engages the arm 42 as a nut 61 is drawn thereagainst to permit the free movement of the link 41 which is not clamped between the head of the bolt 59 and the arm 42 due to the length of the pivot portion 43. The nut 61 is provided with a plurality of serrated edges 62 which engage the surface of the arm 42 to secure the bolt 59 relative thereto and prevent the nut from turning. A slot 63 is provided in the arm to permit the adjustment of the bolt and therefore the pivot relative to the arm.

In Fig. 6 I have shown a further modified form of my invention wherein the locking handle 51 may be entirely eliminated through the substitution of toggle links therefor. A link 65 is pivoted at 39 to a link 33, in place of the link 41, having its other end pivoted at the pivot point 66 of two links 67 and 68 the former of which is pivoted on the arm 42 in place of the link 41, while the link 68 is pivoted at 69 to the end of the bow 22. Links 34 and 45 are secured to the pivot 71 inwardly of the end pivot 69 of the bow 22. When in raised position the links 34 and 45 are substantially in straight line relation as are the links 67 and 68 forming toggle locks for retaining the bow 22 in latched position. This construction only requires the manipulation of the header 19 and eliminates the operation of the secondary clamping elements 51, illustrated in Figs. 1, 2 and 3. When the top is to be collapsed, the top bow 19 is released from the pillars 14 and its rearward movement causes the collapse of the toggles 67, 68, 34 and 45 to permit all of the elements to assume the position illustrated in Fig. 2. It is to be understood that the bow member 22 is drawn forwardly and the bow portion 27 folded on the bow portions 24 to thereby reduce the overall extending length of the two bows when in collapsed position so as to fall within the recess 47 disposed back of the seat.

It will thus be seen that I have provided a top for a vehicle which is extremely simple in operation, which is neat in appearance, which is economical of manufacture, and which is so constructed as to reduce the overall extending dimensions of the top when collapsed so as to be storable in a compartment of minimum dimensions. The reduction of length of the bow members is effected through the hinging of the upper portion relative to the lower portion and in so mounting the secondary bow so as to have its pivot move frontwardly of the vehicle to draw the entire bow forwardly to thereby reduce their rearwardly extending length. A very narrow compartment back of the seat may be utilized for storing the entire top construction which may be completely hidden from view by the application of a cover either of metal, cloth or other material suitable for completely closing the opening back of the seat. When the top is in raised position the compartment may be utilized for storage purposes, as is well known.

While I have described and illustrated but two embodiments of my invention, it will be apparent to those skilled in the art that various changes, omissions, additions and substitutions may be made therein without departing from the spirit and scope of my invention, as set forth in the accompanying claims.

I claim as my invention:

1. A collapsible top for a vehicle body including, in combination, a main bow, a secondary bow, pivoted links connected to the body and main bow and supporting said secondary bow, a second pair of links connecting said secondary bow to said body, a header, a third pair of pivoted links connecting said header forwardly of said main bow, a link interconnecting one of said third pairs of links to the main bow, additional links interconnecting the other link of said third pair to said second pair of pivotal links supporting the secondary bow, all of said links and elements being so related to each other as to retain the header and the main and secondary bows at all times in predetermined changing relation to each other when the top is being raised and lowered and for retaining all of the elements in fixed position when the top is raised.

2. A collapsible top for a vehicle body including, in combination, a main bow, a secondary bow, pivoted links connected to the body and main bow and supporting said secondary bow, a second pair of links connecting said secondary bow to said body, a header, links supporting said header forwardly of the bow, and means interconnecting said header links and the second pair of links for effecting the movement of said secondary bow and said first pair of links.

FRED J. WESTROPE.